3,120,544
ESTERS OF 5,11-DIOXYGENATED - Δ⁹ - DES-A-ES-
TRENE-17β-OL; ESTERS OF 5-OXYGENATED-
Δ⁹⁽¹¹⁾-DES-A-ESTRENE-17β-OL; ESTERS OF 5-
OXYGENATED-9α,11α - EPOXY-DES-A-ESTRANE-
17β-OL AND PROCESS
Gérard Nominé, Noisy-le-Sec, Seine, and Robert Bucourt,
Villiers-le-Bel, Seine-et-Oise, France, assignors to
Roussel-UCLAF, Paris, France, a corporation of
France
No Drawing. Filed Jan. 3, 1962, Ser. No. 164,135
Claims priority, application France Jan. 13, 1961
14 Claims. (Cl. 260—340.9)

The present invention relates to new tricyclic compounds and a process for their preparation and more particularly to 17β-acyloxy-Δ⁹-des-A-estrene-5-ones, corresponding to Formula I:

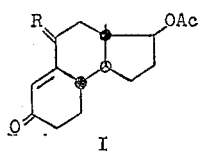

wherein R represents O or

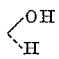

and Ac represents an acyl radical of an organic carboxylic acid having from 1 to 18 carbon atoms.

The tricyclic des-A-estrenes can also be named as derivatives of benzindene but the des-A-estrene terminology is used since the said tricyclic compounds are used as intermediates for steroids and the present terminology is preferred to maintain the steroid numbering system. Another way of defining the said tricyclic compounds is 1-oxygenated-Δ⁸⁽⁹⁾-7-keto-3,4,-[3'-acyloxycyclopentano-(2,1')]-octahydronaphthalenes which is the terminology used in U.S. Patent No. 3,056,811.

The said tricyclic compounds are particularly useful as intermediates in the synthesis of steroidal products and their analogs. They can be transformed, for example, into 11β-hydroxy-19-nor-testosterone which has, according to United States Patent No. 2,778,841, anabolic, corticoidal and estrogenic activities. In conformity with the method indicated by Stork, United States Patent No. 2,793,233, the synthesis of 11β-hydroxy-19-nor-testosterone starting from compound I is realized according to the following reaction scheme:

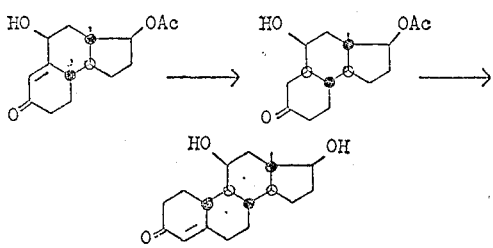

It is an object of the present invention to obtain tricyclic compounds having the formula

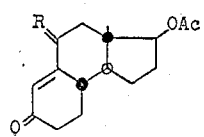

wherein R is a radical selected from the group consisting of =O and

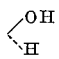

and Ac represents the acyl radical of an organic carboxylic acid having from 1 to 18 carbon atoms.

Another object of the invention is a process for the production of said 11-oxygenated-17β-acyloxy-Δ⁹-des-A-estrene-5-ones.

A further object of the invention is to obtain 17β-benzoyloxy-Δ⁹-des-A-estrene-11β-ol-5-one and 17β-benzoyloxy-Δ⁹-des-A-estrene-5,11-dione.

A still further object of the invention is to obtain the novel intermediates useful in the production of said 11-oxygenated-17β-acyloxy-Δ⁹-des-A-estrene-5-ones:

(a) The 5-ethylenedioxy-17β - acyloxy-Δ⁹⁽¹¹⁾-des-A-estrenes, and particularly the 17β-benzoyloxy derivative;

(b) The 5-ethylenedioxy-9α,11α-epoxy - 17β - acyloxy-des-A-estranes, and particularly the 17β-benzoyloxy derivative.

These and other objects of the invention will become more apparent as the description thereof proceeds.

Our invention comprises tricyclic compounds having the Formula I:

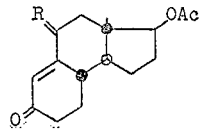

wherein R is a radical selected from the group consisting of =O and and Ac represents the acyl radical of an organic carboxylic acid having from 1 to 18 carbon atoms and more particularly 17β-benzoyloxy-Δ⁹-des-A-estrene-11β-ol-5-one and 17β-benzoyloxy-Δ⁹-des-A-estrene-5,11-dione.

The process of preparing the tricyclic compounds of Formula I is shown by the flow diagram of Table I:

TABLE I

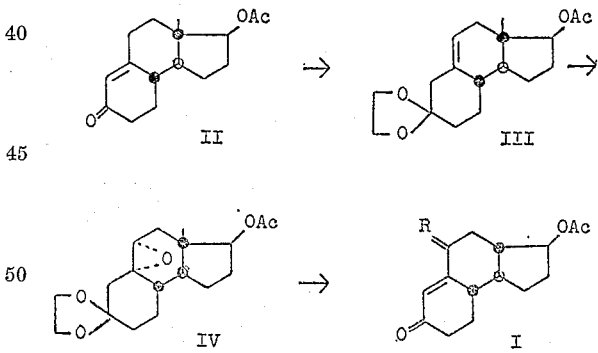

where R and Ac have the above-assigned values.

The process consists in acetalizing a 17β-acyloxy-Δ⁹-des-A-estrene-5-one, II, with ethylene glycol in an inert organic solvent to form 5-ethylenedioxy-17β-acyloxy-Δ⁹⁽¹¹⁾-des-A-estrene, III, reacting this latter compound with an epoxidation agent, reacting the 5-ethylenedioxy-9α,11α-epoxy-17β-acyloxy-des-A-estrane, IV, with an acidic agent whereby the epoxide is opened, and recovering an 11-oxygenated-17β-acyloxy-Δ⁹-des-A-estrene-5-one. 17β-acyloxy-Δ⁹-des-A-estrene-11β-ol-5-one $$\left(\text{Compound I, R}=\diagdown_H^{OH}\right)$$

is recovered first and this compound is oxidized, if desired, to give 17β-acyloxy-Δ⁹-des-A-estrene-5-11-dione (Compound I, R=O).

The preferred method of practicing the process of the invention covers, in particular, but non-limitatively, a method of execution in which:

(a) The acetalization of the 17β-acyloxy-Δ⁹-des-A-estrene-5-one, II, is effected by refluxing with ethylene glycol in an acidic medium, such as p-toluene sulfonic acid in the presence of an anhydrous organic solvent such as benzene, by azeotropically distilling and removing the water formed;

(b) The epoxidation of the 5-ethylenedioxy-17β-acyloxy-Δ⁹⁽¹¹⁾-des-A-estrene, III, is effected with an organic percarboxylic acid, preferably a benzene perdicarboxylic acid such as perphthalic acid in an inert organic solvent at about room temperature;

(c) The opening of the epoxide of 5-ethylenedioxy-9α,11α-epoxy-17β-acyloxy-des-A-estrane, IV, is effected by refluxing in an aqueous organic solvent-lower alkanoic acid mixture, preferably with a mixture of acetic acid and ethyl acetate in water;

(d) The oxidization of 17β-acyloxy-Δ⁹-des-A-estrene-11β-ol-5-one $$\left(\mathrm{I, R}=\!\!\begin{array}{c}\mathrm{OH}\\\mathrm{H}\end{array}\right)$$

is effected by reacting with manganese dioxide in an inert organic solvent at about room temperature.

The starting compounds used in the above process, the 17β-acyloxy-Δ⁹-des-A-estrene-5-ones of the Formula II:

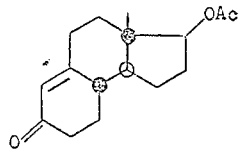

where Ac has the above-assigned meaning, are produced according to Velluz et al., Comptes Rendus, Acad. Sciences, 1960, 250, 1084–5.

The preferred acyloxy derivative employed as the starting compound is 17β-benzoyloxy-Δ⁹-des-A-estrene-5-one. However, in addition to the benzoic acid ester, other esters with organic carboxylic acids having from 1 to 18 carbon atoms such as the alkanoates and alkenoates, for example, the acetate, the trimethylacetate, the propionate, the 4,4-dimethyl-pentanoate, the 10-undecenoate; the cycloalkylalkanoates, for example, the β-cyclopentylpropionate; the arylalkanoates, for example, the phenyl-propionate; the cycloalkanoates, for example, the hexahydrobenzoate, the hexahydroterephthalate and other phenyl-carboxylic acids, 3,5-dinitrobenzoate, may also be prepared without departing from the scope of the invention.

The following examples are given as purely indicative to enable a better comprehension of the invention. It is to be understood that corresponding procedures known to those skilled in the art may be employed.

EXAMPLE I

*Preparation of 17β-Benzoyloxy-Δ⁹-Des-A-Estrene-11β-Ol-5-One*

$$\left(\text{Compound I with Ac}=\mathrm{C_6H_5CO\ and\ R}=\!\!\begin{array}{c}\mathrm{OH}\\\mathrm{H}\end{array}\right)$$

STEP A.—ACETALIZATION 2.5 g. of 17β-benzoyloxy-Δ⁹-des-A-estrene-5-one (Compound II with Ac=C₆H₅CO), having a melting point of 155° C., and a specific rotation [α]$_D^{20}$ =+52° (c.=1% in methanol) were introduced into the following mixture:

Anhydrous benzene _____cc__ 800
p-Toluene sulfonic acid _____g__ 0.3
Ethylene glycol _____cc__ 55

(Compond II was obtained according to Velluz et al., C.R., Acad. Sci., 1960, 250, 1084–1085.)

The reaction mixture was heated to reflux and under a nitrogen atmosphere for a period of six hours. The water formed, entrained by the benzene, was eliminated by causing the condensate to pass over anhydrous silica gel before its return into the reaction vessel. The reaction mixture was cooled and 25 g. of sodium bicarbonate were added. The mixture was agitated for several minutes, filtered and the mineral salts were washed with benzene. The extracts were combined with the benzene wash liquor, washed with water and dried. The dried extract was evaporated to dryness under vacuum. The oil obtained (28.8 g.) was dissolved in 60 cc. of methanol containing 1 part per 1000 of pyridine. 5-ethylenedioxy-17β-benzoyloxy-Δ⁹⁽¹¹⁾ - des - A - estrene (Compound III, Ac=C₆H₅CO) crystallized. After allowing the crystallized suspension to stand overnight at 20° C., it was vacuum filtered and the crystals were washed with methanol containing 1 part per 1000 of pyridine. A yield of 21 g. was obtained (being 74%) having a melting point of 88° C. and a specific rotation [α]$_D^{20}$ =+6.3° (c.=1% in methanol).

*Analysis.*—C₂₃H₂₈O₄: molecular weight=368.45. Calculated: C, 74.96%; H, 7.65%. Found: C, 74.8%; H, 7.7%.

STEP B.—EPOXIDATION 5 g. of 5-ethylenedioxy-17β-benzoyloxy-Δ⁹⁽¹¹⁾-des-A-estrene were introduced into 72 cc. of dichloroethane. 36 cc. of an ethereal solution containing 24% perphthalic acid were added thereto. The mixture was agitated and then allowed to stand for a period of sixteen hours at room temperature. The mixture was thereafter poured into a mixture of an aqueous solution of sodium bicarbonate and dichloroethane. The organic layer was separated, washed with water, dried and evaporated to dryness under vacuum. The residue was taken up in 20 cc. of methanol containing 2% of pyridine at reflux temperature, then cooled to 0° C. 4.85 g. of 5-ethylenedioxy-9α,11α-epoxy - 17β - benzoyloxy-des-A-estrane (Compound IV, Ac=C₆H₅CO) was obtained, having a melting point of 203° C. and a specific rotation [α]$_D^{20}$ =+28° (c.=0.5% in chloroform), being a yield of 93%.

The product occurred in the form of white crystals slightly soluble in methanol, insoluble in water.

*Analysis.*—C₂₃H₂₈O₅: molecular weight=384.45. Calculated: C, 71.84%; H, 7.33%. Found: C, 71.7%; H, 7.5%.

This compound is not described in the literature.

STEP C.—OPENING OF THE EPOXIDE 2.6 g. of 5-ethylenedioxy-9α,11α-epoxy-17β-benzoyloxy-des-A-estrane were introduced into the following mixture:

```
                                               Cc.
Ethyl acetate _____ 15.6
Acetic acid _____ 15.6
Water _____ 5.2
```

The reaction mixture was heated to reflux under an atmosphere of nitrogen for a period of four hours. After cooling, 60 cc. of ethyl acetate were added. The organic layer was separated and washed with a solution of sodium bicarbonate, then with water, dried and evaporated to dryness under vacuum. The residue was triturated with 5 cc. of sulfuric ether, vacuum filtered, dried and then placed in suspension in 3.4 cc. of methanol at boiling point. After cooling to 0° C., the suspension was vacuum filtered and washed with methanol. 1.5 g. of 17β-benzoyloxy-Δ⁹-des-A-estrene-11β-ol-5-one $$\left(\text{Compound I, R}=\!\!\begin{array}{c}\mathrm{OH}\\\mathrm{H}\end{array},\ \mathrm{Ac}=\mathrm{C_6H_5CO}\right)$$

was obtained having a melting point of 190° C. and a specific rotation [α]$_D^{20}$=+63.5° (c.=1% in methanol).
Ultraviolet spectra: λ$_{max.}$=234–235 mμ, $$E^{1\%}_{1\,cm.}=826$$

*Analysis.*—C₂₁H₂₄O₄: molecular weight=340.4. Calculated: C, 74.09%; H, 7.10%. Found: 74.1%; H, 7.4%.

EXAMPLE II

*Preparation of 17β-Benzoyloxy-Δ⁹-Des-A-Estrene-5,11-Dione*

(Compound I with Ac=C₆H₅CO and R=O)

0.6 g. of 17β-benzoyloxy-Δ⁹-des-A-estrene-11β-ol-5-one, prepared according to Example I, were introduced into 120 cc. of dichloroethane. 3 g. of manganese dioxide were added thereto and the reaction mixture was agitated at room temperature for a period of two hours. The mixture was filtered and the manganese dioxide residue was washed. The filtrate was evaporated. The residue was taken up at reflux with methanol, then cooled.

0.48 g. of 17β-benzoyloxyΔ⁹-des-A-estrene-5,11-dione (Compound I, R=O, Ac=C₆H₅CO) was obtained with a yield of 80%. This product had a melting point of 135° C. and a specific rotation $[\alpha]_D^{20} = +74°$ (c.=0.9% in methanol).

*Analysis.*—$C_{21}H_{22}O_4$: molecular weight=338.39. Calculated: C, 74.53%; H, 6.55%. Found: C, 74.5%; H, 6.4%.

It is to be understood that the invention is not limited to the process of the examples given above and other expedients can be employed without departing from the spirit of the invention and the scope of the appended claims.

We claim:

1. A tricyclic compound of the formula

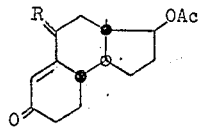

wherein R is a radical selected from the group consisting of =O and

and Ac represents the acyl radical of an organic hydrocarbon carboxylic acid having from 1 to 18 carbon atoms.

2. A compound of the formula

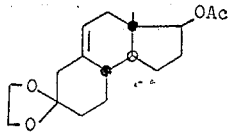

wherein Ac represents the acyl radical of an organic hydrocarbon carboxylic acid having from 1 to 18 carbon atoms.

3. A compound of the formula

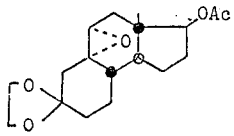

wherein Ac represents the acyl radical of an organic hydrocarbon carboxylic acid having from 1 to 18 carbon atoms.

4. The process of preparing a tricyclic compound of the formula

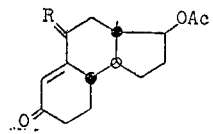

wherein R is

and Ac represents the acyl radical of an organic hydrocarbon carboxylic acid having from 1 to 18 carbon atoms, which comprises the steps of acetalizing a compound having the formula

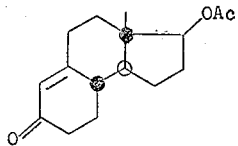

wherein Ac has the above-assigned meaning, with ethylene glycol in an inert organic solvent, reacting the resulting acetal compound having the formula

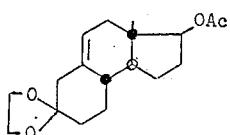

wherein Ac has the above-assigned meaning, with an epoxidation agent, reacting the resulting epoxy compound having the formula

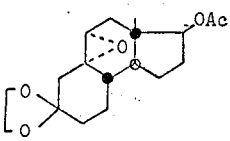

wherein Ac has the above-assigned meaning, with an aqueous organic solvent-lower alkanoic acid mixture, whereby the epoxide is opened, and recovering said tricyclic compound.

5. The process of claim 4, wherein said epoxidation agent is an organic percarboxylic acid in an inert organic solvent and the reaction occurs at about room temperature.

6. The process of claim 5, wherein said organic percarboxylic acid is perphthalic acid.

7. The process of claim 4, wherein said aqueous organic solvent-lower alkanoic acid mixture is a mixture of acetic acid, ethyl acetate and water.

8. The process of preparing 17β-benzoyloxy-Δ⁹-des-A-estrene-11β-ol-5-one, which comprises the steps of refluxing 17β-benzoyloxy-Δ⁹-des-A-estrene-5-one with ethylene glycol in an acidic medium in an anhydrous organic solvent, reacting the resulting 5-ethylenedioxy-17β-benzoyloxy-Δ⁹⁽¹¹⁾-des-A-estrene with perphthalic acid in an inert organic solvent at about room temperature, refluxing the resulting 5 - ethylenedioxy-9α,11α-epoxy-17β-benzoyloxy-des-A-estrane with a mixture of an inert organic solvent, a lower alkanoic acid and water, and recovering said 17β-benzoyloxy-Δ⁹-des-A-estrene-11β-ol-5-one.

9. The process of preparing 17β-benzoyloxy-Δ⁹-des-A-estrene-5,11-dione, which comprises the steps of refluxing 17β-benzoyloxy-Δ⁹-des-A-estrene-5-one with ethylene glycol in an acidic medium in an anhydrous organic solvent, reacting the resulting 5-ethylenedioxy -17β-benzoyloxy-Δ⁹⁽¹¹⁾-des-A-estrene with perphthalic acid in an inert organic solvent at about room temperature, refluxing the resulting 5 - ethylenedioxy-9α,11α-epoxy-17β-benzoyloxy-des-A-estrane with a mixture of an inert organic solvent, a lower alkanoic acid and water, reacting the resulting 17β-benzoyloxy - Δ⁹ - des-A-estrene-11β-ol-5-one with manganese dioxide in an inert organic solvent at about room temperature, and recovering said 17β-benzoyloxy-Δ⁹-des-A-estrene-5,11-dione.

10. A compound of the formula

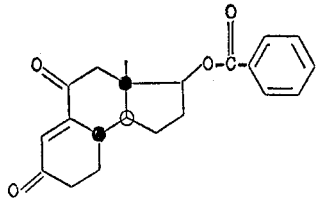

11. A compound of the formula

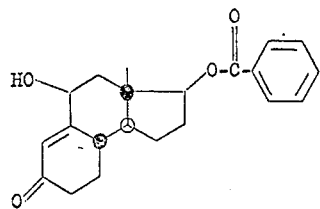

12. A compound of the formula

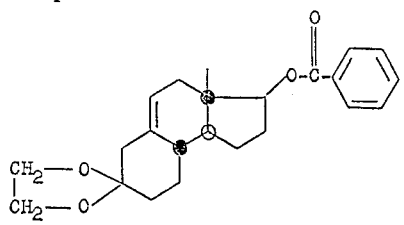

13. A compound of the formula

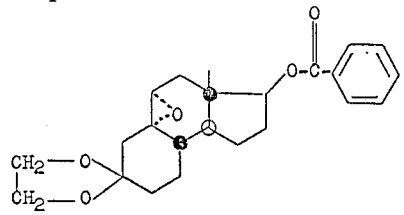

14. The process of preparing a tricyclic compound of the formula

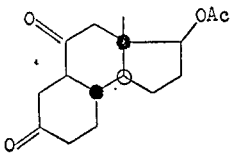

wherein Ac is an acyl radical of an organic hydrocarbon carboxylic acid having 1 to 18 carbon atoms which comprises the steps of acetalizing a compound of the formula

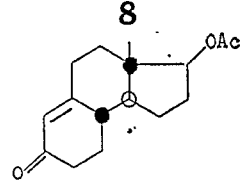

wherein Ac has the above definition with ethylene glycol in an inert organic solvent, reacting the resulting acetal compound of the formula

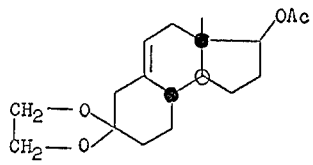

wherein Ac has the above definition with an epoxidation agent, reacting the resulting epoxy compound of the formula

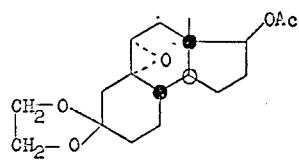

wherein Ac has the above definition with an aqueous organic solvent-lower alkanoic acid mixture, oxidizing the resulting hydroxylated compound of the formula

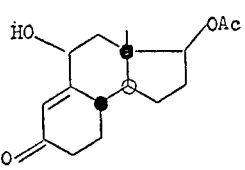

wherein Ac has the above definition with magnesium dioxide and recovering the said tricyclic compound.

References Cited in the file of this patent

UNITED STATES PATENTS 2,778,841    Ralls  ---------------- Jan. 22, 1957
2,793,233    Stork  ---------------- May 21, 1957